Patented Nov. 4, 1941

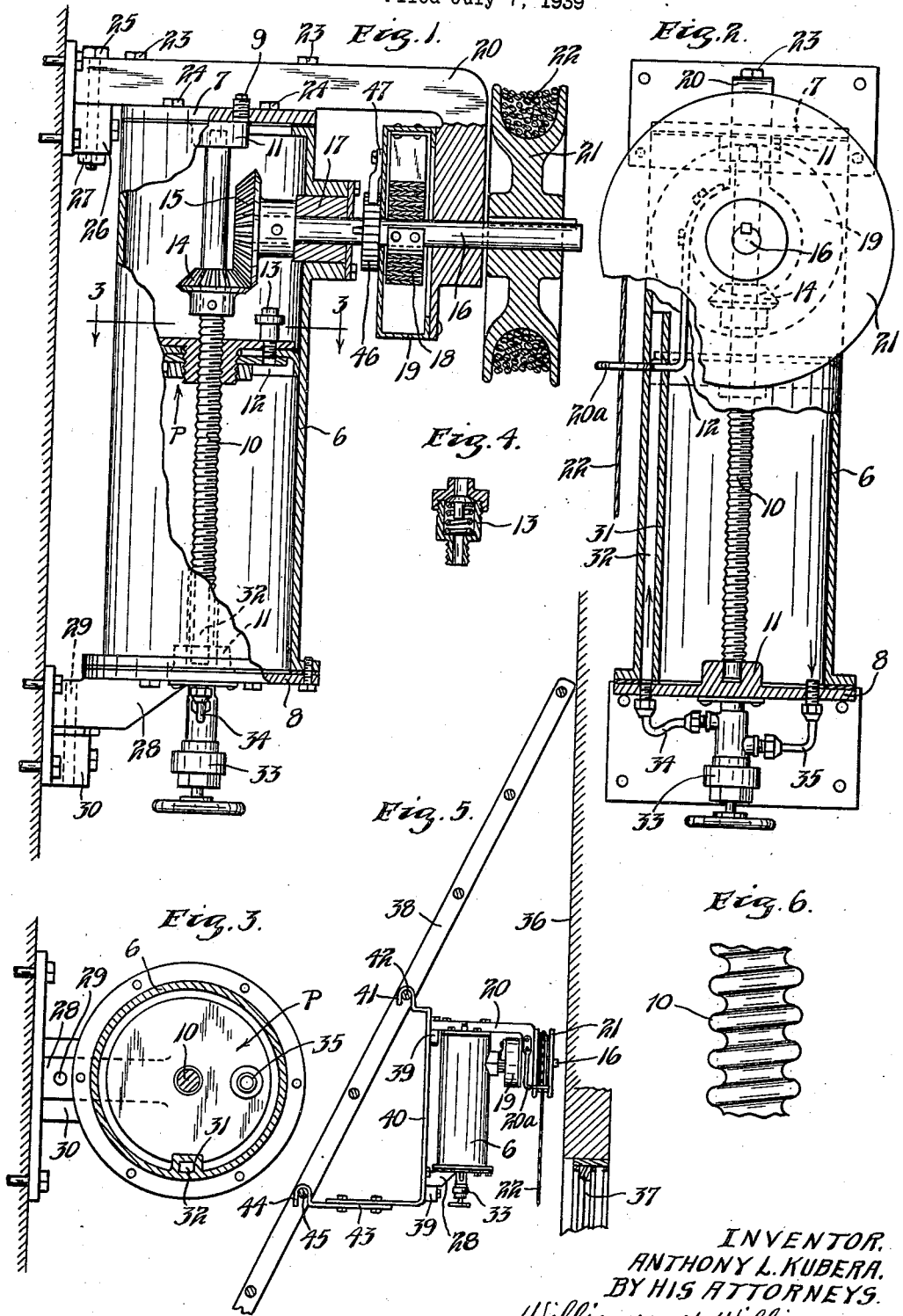

2,261,261

UNITED STATES PATENT OFFICE 2,261,261

WEIGHT LOWERING RETARDING DEVICE

Anthony L. Kubera, Minneapolis, Minn., assignor of one-third to Edwin L. Frederickson and one-third to Clarence N. Beach, Minneapolis, Minn.

Application July 7, 1939, Serial No. 283,214

2 Claims. (Cl. 183—91)

This invention relates to devices for lowering weights from points elevated above the ground, and it is particularly adaptable for use as a fire escape, whereby persons may be lowered from the windows of burning buildings without danger. Although this particular use of the invention is given more attention in the following description, it should be remembered that it can also be used for lowering heavy objects such as furniture and building material from considerable heights.

One of the objects of the invention is to provide a weight lowering device which will effectively retard the speed of descent of the person or object being lowered in order that such descent can be made with safety.

A more specific object of the invention is to provide a weight lowering device including a reel upon which a cable is adapted to be wound, a cylinder adapted to contain a relatively highly viscous liquid, a piston movable in the cylinder under the influence of rotation of the reel, and a bypass permitting the flow of liquid from one side of the piston to the other, this bypass being incorporated in a key or guide which is adapted to prevent rotation of the piston within the cylinder. The piston is prevented from rotation due to the fact that it is mounted upon and moved by a threaded shaft, which in turn is rotated by suitable connections with the cable carrying reel.

These and other objects and advantages of the invention will more fully appear from the following description made in connection with the accompanying drawing, wherein like reference characters refer to the same parts throughout the views, and, in which:

Fig. 1 is a side elevation with portions of the cylinder broken away and with the piston, reel and cable returning spring in section;

Fig. 2 is a view partially in front elevation with portions of the cylinder and reel broken away;

Fig. 3 is a transverse section taken approximately on the line 3—3 of Fig. 1;

Fig. 4 is a vertical section of the check valve incorporated with a piston to facilitate flow of liquid from one side of the piston to the other during the return of the cable to the reel;

Fig. 5 is a view showing the lowering mechanism in side elevation and equipped with a special bracket permitting it to be hung from the rungs of a ladder; and Fig. 6 is an enlarged fragmentary elevation of a type of screw thread adaptable to my invention.

My invention includes a cylinder 6 which is provided with heads 7 and 8. These heads are secured to the ends of the cylinder with liquid tight sealing means, such as a suitable gasket. The head 7 is provided with an opening normally closed by a plug 9 to permit filling of the cylinder with liquid. A threaded or partially threaded shaft 10 is mounted axially within the cylinder and is rotatable in suitable journals 11. Mounted upon the threaded portion of the shaft 10 is a piston P provided with suitable packing 12. The packing need not be used if desired if the piston has a relatively close fit in the cylinder. The liquid in the cylinder is highly viscous, as stated above, and the amount of leakage past the piston would make no material difference. A check valve indicated generally at 13 is mounted in the piston 12 to permit the flow of liquid downwardly as the piston moves up as viewed in Fig. 1. The check valve, however, prevents the flow of liquid therethrough when the piston is moved in a downward direction. This is clearly illustrated by the sectional view of Fig. 4.

The shaft 10 is provided with a bevel gear 14 at the top of the threaded portion of said shaft, and this gear meshes with a cooperating bevel gear 15, the latter being mounted on one end of a shaft 16 which is horizontally disposed and extends from the interior of the cylinder through a suitable liquid tight bearing 17. The shaft 16 carries a coiled spring 18, the inner end of the spring being suitably connected to the shaft as indicated. The outer end of said spring is connected to a casing 19 which is supported on a right-angled bracket 20. The shaft 16 extends through the downwardly extending arm of bracket 20 and is rotatable therein. The outer end of the shaft 16 has a pulley 21 keyed thereto as clearly shown in Fig. 1. It will be noted that the pulley has a relatively deep circumferential groove therein, and the pulley acts as a reel upon which is wound a suitable cable 22 which is designed to support a considerable amount of weight. The bracket 20 is connected to the upper cylinder head 7 as by welding, and if desired, head studs 23 may extend through the bracket 20, cylinder head 7, and into the end of the wall of the cylinder 6. These studs are adapted to supplement conventional head studs 24. It will be seen particularly from Fig. 1 that the bracket 20 extends to the left a short distance beyond the side of the cylinder 6 and said extension carries a bolt or pin 25 which extends downwardly from the end of the bracket and is adapted to fit into a suitable opening in a cooperating bracket portion 26. If desired, a nut 27 may be threaded on the lower end of the pin or bolt 25. Bracket 26 is relatively flat and adapted to be secured against the outer wall of a building.

Bracket 28 is secured as by welding or other suitable means to the lower piston head 8, and extends laterally or radially a distance equal to the lefthand extension of the upper bracket 20, said bracket member 28 carrying a pin 29 which fits into a suitable opening in a cooperating bracket element 30 which is identical in structure to the upper bracket 26.

It will be seen that rotation of the reel or pulley 21 will cause rotation of the vertical threaded shaft 10 through the medium of horizontal shaft 16 and gears 14 and 15, and as the piston P is held against rotation said piston will be forced to travel up or down the threaded portion of the shaft 10 depending on the direction of rotation of reel 21. The piston P is held against rotation but permitted to slide by the provision of a guide or key 31 which is formed integrally with or rigidly secured to the inner wall of the cylinder 6. This guide element is adapted to extend throughout the length of the piston a distance at least equal to the length of the threaded portion of the shaft 10. The sectional view in Fig. 3 shows the guide element 31 extending through a suitable notch in the piston P. It will be further noted in Figs. 2 and 3 that the guide 31 has a passageway formed therethrough from end to end. This passageway is indicated at 32. The upper end of the passage in the guide 31 opens into the interior of the cylinder 6 above the highest point of travel of piston P, and the lower end of the passageway or fluid conduit in the guide is connected to a valve 33 through the medium of a tube 34. A second tube 35 connects the valve to the interior of the cylinder on the opposite side of the piston from the upper outlet of the passageway in the guide 31.

When the cylinder has been completely filled with liquid and the device has been suitably supported as on the bracket elements 26 and 30 with the cable 22 wound up on the reel 21, the device is ready for use. A person escaping from a burning building or a weighted object is to be lowered from a building or other elevated point, the person or weight is securely fastened to the free end of the cable 22 and the weight thus imposed will cause rotation of reel 21, horizontal shaft 16 and vertical threaded shaft 10. If the cable is wound upon the reel 21 in such a manner that the reel will be rotated in a counter-clockwise direction, as viewed in Fig. 2, as the weight is lowered and if the shaft 10 is provided with righthand threads, the piston P will be forced downwardly in the cylinder 6. As the piston moves downwardly it encounters the resistance of liquid in the cylinder, and this liquid is forced through the lower cylinder head 8, tube 35, valve 33, tube 34 and passageway 32 in the guide 31 from whence it is bypassed to the upper side of piston P. The viscosity of the liquid in the cylinder, which may be glycerin or some other suitable liquid, controls the movement of the piston downwardly in combination with the size of the bypass conduits, and this speed of movement may also be regulated by means of the valve 33 which is adapted to restrict or enlarge the flow capacity of the liquid between tubes 34 and 35. The details of this valve are not set forth since any suitable type of control valve may be used. It will be seen, therefore, that a weighted object or a person may be lowered from a considerable height at a speed which will eliminate any danger as the object or person encounters the ground.

As the weight or person is being lowered, rotation of shaft 16 will result in winding or coiling of the coil spring 18 and when the weighted object or person has been disconnected from the cable 22 on the ground, the cable can be released and the spring 18 which is then tightly wound will cause rotation of shaft 16 and its cooperating threaded shaft 10 in a reverse direction to the one which the shafts move in during lowering of the weight. Naturally there is no need for as great resistance to rotational movement of the reel and shaft on the upward movement of the cable when it is wound upon the reel and for that reason the check valve 13 is provided. As stated above this valve permits the flow of liquid through the piston as well as through the bypass provided by the passageway 32 in the guide 31. Thus the resistance to movement of the piston is reduced to a considerable extent and the apparatus is returned to its original position readily for re-use.

The bracket 20 which assists in supporting the horizontally disposed shaft 16 is conveniently secured to the upper cylinder head 7 and not only supports the shaft 16 with its reel 21, but also the spring casing 19. As stated above, the bracket 20 furthermore has its opposite end provided with means for easily and quickly attaching the unit to suitable supporting brackets 26 and 30.

In Fig. 5 there is shown diagrammatically the outer face 36 of a building wall. A window frame 37 is indicated more or less diagrammatically also.

The upper end of a ladder 38 is shown resting against the outer face of the building wall 36 in the usual inclined position. The lowering unit is indicated generally by designation of the cylinder 6. The bracket elements 20 and 28 are shown secured to blocks 39 which are provided with suitable vertical openings in the same manner as the fixed bracket elements 26 and 30. The blocks 39 are secured on a vertical bracket element 40 whose upper end is provided with a suitable hook formation 41 so that it can be hung over a rung 42 of the ladder 38. The lower portion of the bracket 40 is bent to a horizontal position and has a complementary horizontal bracket portion 43 secured thereto for any adjustment by any suitable clamping means. The bracket element 43 is provided with a hooked end 44 to fit over a rung 45 which is positioned below the rung 42 on the ladder 38. With this bracket the weight lowering unit can be carried by firefighting equipment and firemen can hang it from a ladder in the manner shown adjacent the upper portions of a window to permit the removal of persons from burning buildings where such weight lowering mechanism is not mounted upon the building as a permanent escape means.

While it is not absolutely necessary I find it advisable to provide a cable guide 20a which is suitably connected to the outer end of the bracket 20 so that the cable will feed properly from the reel 21 as the cable is rewound and will be guided properly to the cable on the return movement of the device when the cable is wound upon the reel.

In Fig. 6 there is shown an enlarged fragment of the screw 10 which is preferably used to carry the piston 12. It will be noted that this screw has a thread whose rib is semi-circular in cross section. The depression or groove between adjacent rib convolutions is also semi-circular and is concave. The transverse lines of rib and groove form a compound curve, each portion of which is a semi-circle.

This type of thread is found to be of particular advantage in a structure such as the weight lowering device disclosed herein since it more effectively prevents leakage of fluids between the threaded shaft and the piston and it has considerably more frictional resistance. It is, of course, contemplated that the central aperture in the piston 12 is to have a female thread of the same construction to closely fit the male thread shown in Fig. 6.

In some cases it is found desirable to provide means for preventing the cable from suddenly rewinding on the reel under the influence of the spring 18. I, therefore, provide a ratchet wheel 46 which is keyed on the horizontal reel shaft 16 as shown in Fig. 1. A dog 47 is pivotally secured on the stationary spring housing 19. It permits rotation of the ratchet and shaft during unwinding or lowering of the cable, but prevents return movement until the dog is released from the ratchet teeth.

It will be seen from the drawings and the above description that I have provided an extremely compact combination of elements which as a unit can be conveniently hung adjacent a window in a building, either upon the permanent brackets or upon a ladder, for the purpose of removing persons from the building and lowering them alongside the outer wall or for lowering heavy objects such as building materials, safes and various articles of furniture. The liquid bypass mechanism is incorporated with the cylinder guide to eliminate as much as possible the use of tubing on the outside of the cylinder. The bracket 20 has the combined function of acting as a supporting bracket for the unit as well as a journal and support for the shaft 16 which carries the spring 18 and the reel 21. It should be further noted that the bracket 20 also supports the spring casing 19.

It will, of course, be understood that various changes may be made in the form, details, arrangement and proportions of the various parts without departing from the scope of my invention.

What is claimed is:

1. In a weight lowering device including a cylinder adapted to contain fluid, an axially threaded shaft rotatably mounted in said cylinder, a piston threaded on said shaft and slidably fitting the inner wall of said cylinder, and wherein rotary weight lowering means is connected to said shaft, said cylinder having a longitudinally disposed portion of its wall projecting into said cylinder and extending from an end of the cylinder to a point adjacent the other end thereof, said projecting portion having a fluid conduit formed therein, a removable end plate for said cylinder, said end plate abutting an end of said fluid conduit, a bypass conduit mounted on said end plate and extending therethrough at two spaced points, one end of said bypass conduit being in registry with an end of said first mentioned fluid conduit, the other end of said bypass conduit communicating with the main interior portion of said cylinder, and said piston being cut away to accommodate the inwardly projecting portion of said cylinder wall.

2. The structure in claim 1 and said piston having a packing ring therearound, a portion of said packing ring and piston being cut away, and said inwardly extending cylinder wall portion projecting into the cut away portion of said packing ring and said piston.

ANTHONY L. KUBERA.